Nov. 10, 1936.  W. VAN B. ROBERTS  2,060,592
OSCILLATION GENERATOR
Filed Sept. 27, 1933

INVENTOR
WALTER VAN B. ROBERTS
BY
ATTORNEY

Patented Nov. 10, 1936

2,060,592

UNITED STATES PATENT OFFICE 2,060,592

OSCILLATION GENERATOR

Walter van B. Roberts, Princeton, N. J., assignor to Radio Corporation of America, a corporation of Delaware Application September 27, 1933, Serial No. 691,116

6 Claims. (Cl. 250—36)

My present invention relates to regenerative oscillation generators and has as its main object the provision of a tube oscillatory system which shall produce oscillations of exceedingly constant frequency.

In the ordinary regenerative oscillation generator, because of the relatively large amount of feedback, oscillations may take place throughout a band of frequencies, even though the system is electromechanically controlled as, for example, by a piezo-electric crystal. The changes in frequency of the oscillations generated correspond and may may be ascribed to shifts in phase between anode voltages and the feedback control electrode voltages. According to my present invention, I prevent frequency drift by providing a circuit wherein the amount and phase of the feedback are controlled in such a way that the system will not oscillate unless the feedback phase is adjusted to its optimum value. With my present arrangement any departure from a desired frequency will reduce the magnitude of feedback and also cause the feedback phase to depart from optimum conditions. Consequently, since I make my circuit barely able to oscillate at the desired frequency it will not oscillate at all at a different frequency and so since once the system is started oscillating, it persists in its generating condition at the desired frequency which is exceedingly stable.

Figure 1:
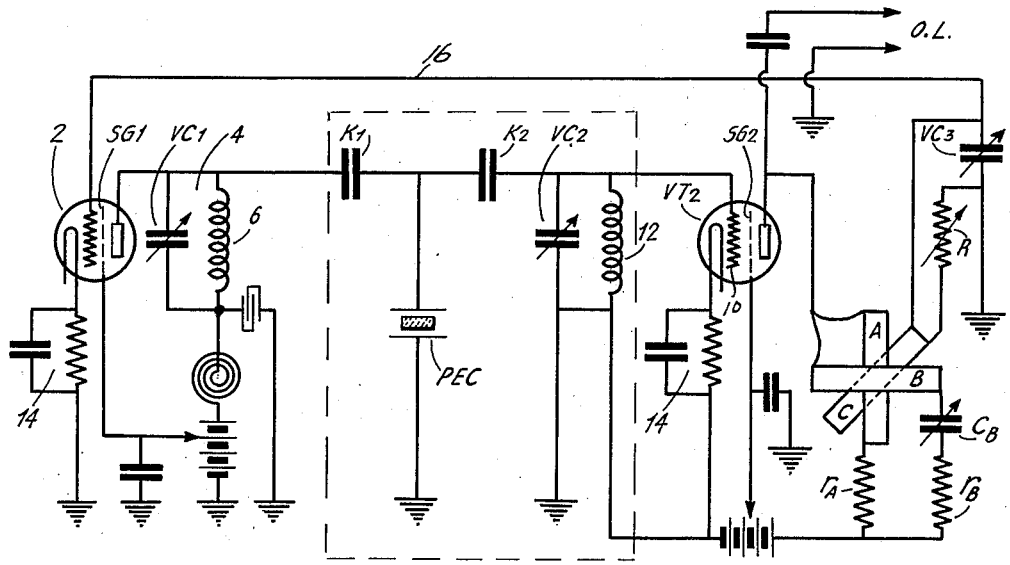
Figure 2:
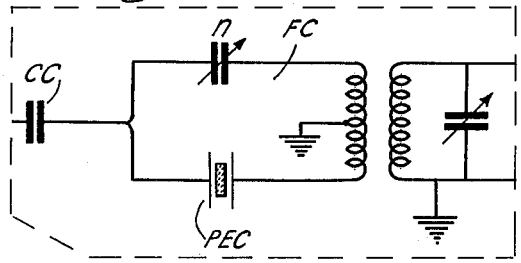
Figure 3:
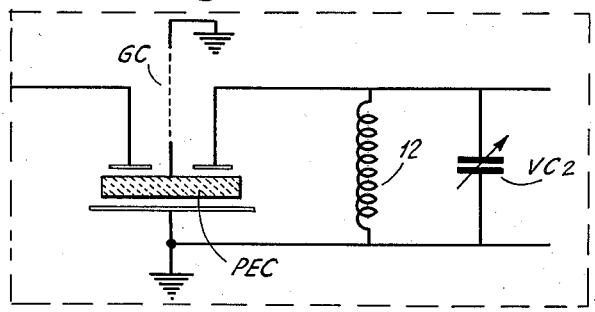

In the further description of my present invention I shall make detailed reference to the accompanying drawing, wherein, Figure 1 illustrates a crystal controlled oscillatory system employing the principles to which I have already adverted; and, Figures 2 and 3 are partial wiring diagrams of modifications.

Turning to Figure 1, a vacuum tube or electron discharge device 2 of the screen grid type, is provided with a tuned plate or anode circuit 4 having a variable tuning condenser VC1 and inductor 6. Energy from the tuned circuit 4 is fed through the very small capacities K1, K2, to the control electrode or grid 10 of a second vacuum tube VT2. The input circuit of the electron discharge device VT2 consists of a variable tuning condenser VC2 and inductance coil 12. The vacuum tube VT2 is, like vacuum tube 2, provided with a screen grid SG2 and like vacuum tube 2 is provided with a grid leak condenser arrangement 14 for establishing a suitable bias upon its control electrode 10.

In the plate circuit of vacuum tube VT2 there are connected as illustrated, coils A and B. Resistor $r_A$ is connected in series with coil A and the series combination of the condenser $C_B$ and resistance $r_B$ is connected in series with the plate coil B. Coils A and B are arranged at right angles to each other, and, through the phase shifting action of the resistor $r_A$ and the condenser-resistance combination $C_B$, $r_B$, produce a rotating magnetic field in which a third coil C is rotatably mounted. The coil C is tuned by means of a variable condenser VC3.

For frequency stabilization purposes, a piezo-electric crystal PEC is connected between the condensers K1, K2 and ground as illustrated. While the piezo-electric crystal adds much to the frequency stability of the system which goes into oscillation by virtue of the feedback through conductor 16, there is still a small range over which it is possible that frequency drifts occur. To prevent even those small drifts, and to make the system oscillate very closely to a natural frequency of the piezo-electric crystal PEC, the orientation of coil C, which controls the phase of feedback, and the tuning of the circuits by the condensers VC1, VC2, VC3 are adjusted to cause oscillation when the resistor R is at a maximum value, the latter, in turn, controlling the amount of feedback. With such an adjustment, the desired frequency is transmitted by the circuits tuned by the condensers VC1, VC2, VC3 better than any other frequency would be, at which time, of course, the phase of feedback is optimum. Therefore, any departure from the desired frequency will not only reduce the magnitude of feedback voltage but also it will make the feedback phase depart from optimum value. Consequently, with the coil C and resistance R adjusted so that the circuit is barely able to oscillate at the desired frequency, it will not oscillate at all at a different frequency. But since the circuit, once set into oscillation will not of its own accord stop oscillating, it will continue to oscillate at a frequency exceedingly close to the natural frequency of the piezo-electric crystal.

Output energy may be taken if desired from the tuned circuit 4, or as shown, from the output leads OL.

The system shown in Figure 2 is identical with the arrangement shown in Figure 1 with the exception that the crystal coupling system is changed i. e., that portion of Figure 2 which is included in dotted lines can be substituted bodily for the portion of Figure 1 shown within the rectangle composed of dotted lines. The coupling condenser CC of Figure 2 is made large.

The energy transfer is made through a filter circuit FC including the piezo-electric crystal PEC whose interelectrode capacity is neutralized by the neutralizing condenser $n$. Consequently, by the use of the filter circuit FC of Figure 2, even greater frequency constancy is insured.

Figure 3 similarly represents another circuit arrangement which can be substituted bodily for that portion of Figure 1 shown within the dotted lines, and illustrates another manner in which the crystal may be connected between the tubes 2 and VT2 of Figure 1. In Figure 3 the crystal PEC is provided with a grounded shield GC which prevents electrostatic transfer of energy between the crystal electrodes. Consequently, the energy transfer is limited to the mechanical motion of the crystal, the capacitive transfer being eliminated by means of the grounded shield GC rather than by the neutralization system of Figure 2.

In place of the crystal PEC of Figure 1, other electro-mechanical vibrators may be used such as a magnetostriction rod. Other changes, of course, will readily suggest themselves to those skilled in the art and consequently my present invention is not to be limited by the drawing, but is to be given the full breadth, width and depth indicated by the appended claims.

Having thus described my invention, what I claim is:

1. A constant frequency generating system comprising a vacuum tube having input electrodes and output electrodes, a high frequency circuit connected between said output electrodes, an electron discharge device having input electrodes and output electrodes, a high frequency circuit interconnecting the input electrodes of said device, means including a piezo-electric crystal for coupling together said high frequency circuits, and means for establishing feedback from the output electrodes of said device to the input electrodes of said tube, said feedback establishing means including means for controlling the amount of feedback, and means for independently adjusting the phase of feedback.

2. In combination, a vacuum tube having input and output electrodes, a tuned circuit connected between said output electrodes, an electron discharge device having input and output electrodes, a tuned circuit connected to the input electrodes of said electron discharge device, means including a piezo-electric crystal coupling said tuned circuits together, and, a feedback system for feeding back energy from the output electrodes of said device to the input electrodes of said tube, said feedback system including means for controlling the amount of feedback and additional means for controlling the phase of feedback.

3. In combination, a pair of electron discharge devices, means including an electro-mechanical vibrator for coupling the output of one of said devices to the input of the other of said devices, means for establishing feedback from the output of said last mentioned device to the input side of said first mentioned device, said last means comprising three coils, two of which are in said last output circuit and disposed at an angle with respect to each other, said third coil being coupled to said two coils to collect the resultant field from said first two coils, means in circuit with said third coil for controlling the amount of feedback, the orientation of said third coil adjusting the phase of the feed back energy.

4. In combination, a vacuum tube having input and output electrodes, a tuned circuit connected between said output electrodes, an electron discharge device having input and output electrodes, a tuned circuit connected to the input electrodes of said electron discharge device, means including an electromechanical vibrator coupling said tuned circuits together, and, a feedback system for feeding back energy from the output electrodes of said device to the input electrodes of said tube, said feedback system including means for controlling the amount and the phase of feedback.

5. In combination, a first electron discharge device having input and output electrodes and a tuned circuit connected to said output electrodes, a second electron discharge device also having input and output electrodes but having a tuned circuit connected to its input electrodes, a selective circuit interconnecting both said tuned circuits, two inductance coils at an angle with respect to each other connected between the output electrodes of said second device, a resistance in series with one of said coils, and a condenser in series with the other of said coils, and a movable third coil in the field of said two coils, said third coil being coupled back to the input electrodes of said first device for establishing feedback.

6. In combination, in an oscillation generation circuit, first and second electron discharge devices, each having input and output circuits, a circuit including a highly selective resonator coupling the output of said first device to the input of said second device, a feedback circuit extending from the output of said second device to the input of said first device, means for adjusting the magnitude of the energy in said feedback circuit and, independently of said last means, the phase of the energy in said feedback circuit to maintain oscillations with minimum of feedback magnitude, and a load circuit coupled to the output of said second device.

WALTER van B. ROBERTS.